Sept. 28, 1937.                H. B. BROWN                 2,094,057
            APPARATUS FOR TIMING WATCHES, CLOCKS, AND THE LIKE
                            Filed May 1, 1936
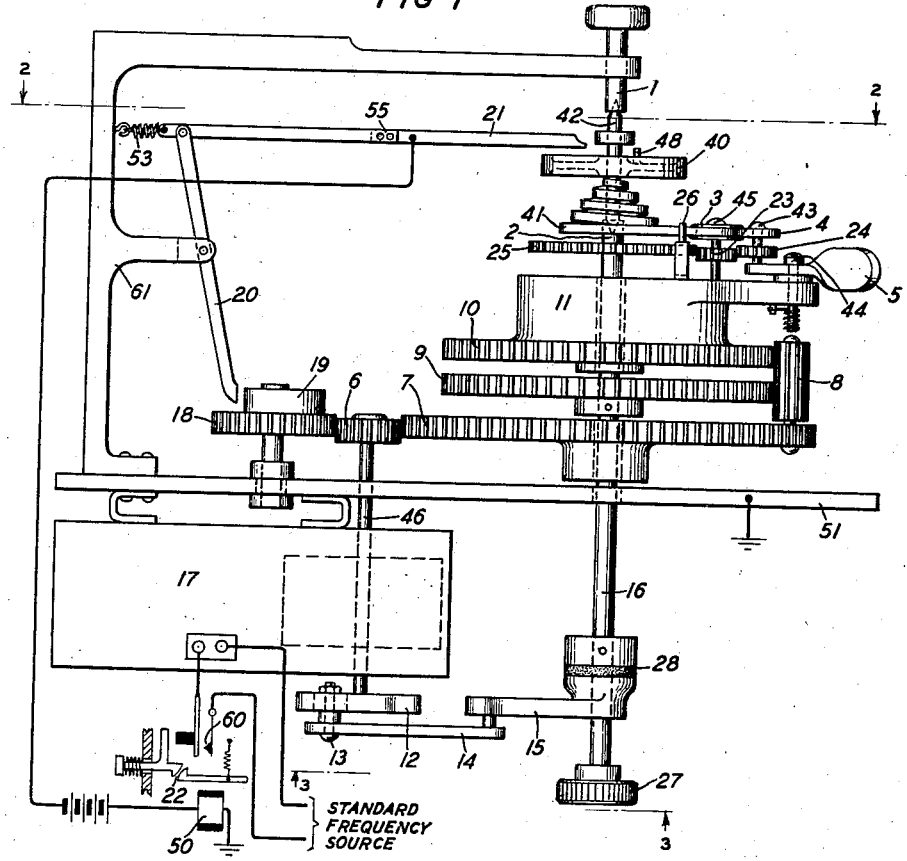
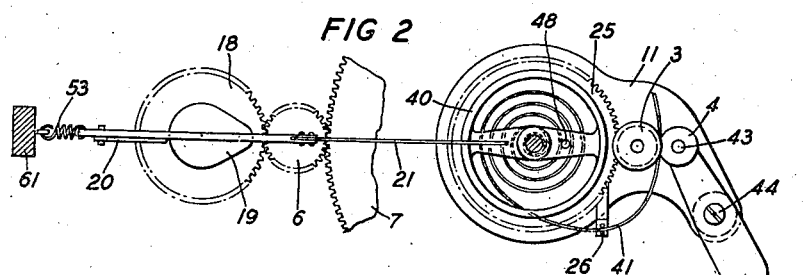
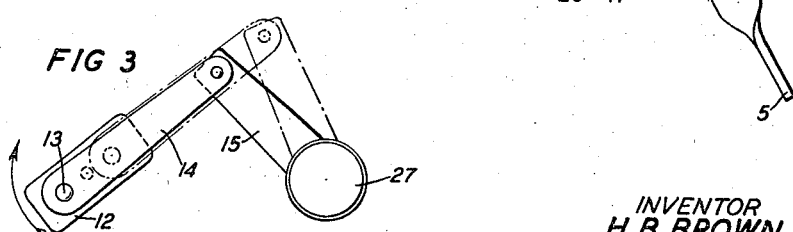
INVENTOR
H. B. BROWN
BY
*H. G. Bandfield*
ATTORNEY Patented Sept. 28, 1937

2,094,057

UNITED STATES PATENT OFFICE 2,094,057

APPARATUS FOR TIMING WATCHES, CLOCKS, AND THE LIKE

Henry B. Brown, Madison, N. J., assignor to Electrical Research Products, Inc., New York, N. Y., a corporation of Delaware Application May 1, 1936, Serial No. 77,293

10 Claims. (Cl. 73—51)

This invention relates in general to a method of and apparatus for timing watches, clocks and the like and more particularly to an apparatus for automatically adjusting the balance wheel and hair-spring assemblies of such timepieces.

In order for a watch or clock to function as a precision time-keeper, it is essential that the balance assembly thereof, comprising the balance wheel and hair-spring, vibrate consistently a definite number of times during a given period of time. This is evident from the fact that the watch hands merely indicate the total number of vibrations the balance assembly has made in a given space of time. Since the majority of watches are designed to function accurately when controlled by an escapement making two and a half oscillations per second, or five half oscillations or beats per second, it is essential that the balance assembly be so designed as to have a natural resonant frequency of five beats per second, that is to say, its amplitude of vibration should reach a maximum when being driven at a frequency of five beats per second.

Since the effective length of the hair-spring is a factor in determining the natural period and therefore the resonant frequency of the balance assembly, it would appear that once a balance assembly having the desired resonant frequency was obtained, the effective length of its hair-spring could be measured and used as a standard for the hair-springs of all balance assemblies. Such a procedure cannot be followed, however, owing to the delicate nature of the watch hair-spring and the unavoidable manufacturing variations in thickness, width and consistency of material. It is necessary, therefore, that an individual testing operation on each hair-spring and balance wheel assembly be made before it is installed in a watch. Usually these tests have been made by hand, comparing the rate to that of a master over a few vibrations and making compensating adjustments in the hair-spring length until the two are apparently the same. Such tests are of a laborious and tedious nature and require considerable time for their completion.

It is accordingly, the object of this invention to simplify and expedite the testing and regulation of the balance assemblies of timepieces, such as watches, clocks, etc.

This object is attained in accordance with a feature of the invention by the provision of a machine which functions in a fully automatic manner to impart to the balance wheel and hair-spring assembly of a watch a slight oscillatory motion of a predetermined frequency and to simultaneously effect a gradual reduction in the length of the hair-spring until the resonant frequency of its oscillations coincides with the predetermined frequency. The motion imparted to the balance assembly has very little effect thereon until resonance is approached, when the amplitude of vibration will begin to build up rapidly. When it reaches the predetermined value, a relay is caused to operate to automatically stop the machine, leaving a correctly timed balance ready for removal from the machine.

The invention will be readily understood from the following detailed description made with reference to the accompanying drawing in which:

Fig. 1 is a skeletonized schematic assembly drawing of the machine embodying the features of this invention;

Fig. 2 is an end view of the machine taken along the line 2—2 of Fig. 1 and looking in the direction of the arrows; and Fig. 3 is a fragmentary view taken along the line 3—3 of Fig. 1 and looking in the direction of the arrows.

The hair-spring balance wheel assembly of a watch constitutes a mechanical tuned circuit, analogous in every respect to an electrical tuned circuit. If a voltage of frequency other than the resonant frequency of an electrical tuned circuit is applied to its terminals, little current flows compared to that which flows when a voltage at the resonant frequency is applied. Similarly, when a mechanical tuned circuit is subjected to an oscillating force at a frequency other than its resonant frequency, very little oscillation of the tuned circuit will result, while a driving force having the same frequency as the resonant frequency will produce tremendous amplitudes of oscillations, limited only by the resistance of the bearings, windage, etc. This is the principle underlying the operation of the device of this invention, namely, that the coincidence of a driving force frequency with the resonant frequency of a driven system produces large amplitudes of vibration in the driven system.

In the present application, the driving frequency is fixed at an accurately maintained constant value, equivalent to the correct beat of the watch to be timed; and a constant of the driven system, i. e., the hair-spring length, is varied automatically until the resonant frequency matches the driving frequency as evidenced by the suddenly increased amplitude of vibration of the driven system.

Referring now to the drawing, a watch balance, comprising the balance wheel 40, hair-spring 41 and the shaft or staff 42 is mounted in pivot bearings 1 and 2 which are properly suited for the reception of the shaft or staff 42 and constructed in such a manner as to simplify and expedite the mounting and demounting of the balance.

The free end of the hair-spring 41, cut longer than ultimately desired, is placed between rollers 3 and 4, the latter being mounted on a pin 43 which is carried on the manually operable member or handle 5 which in turn is pivotally supported by means of screw 44 on the bracket 11 integrally associated with the gear 10. The roller 3 is supported on the bracket 11 by means of pin 45. The pins 43 and 45 also carry the gears 23 and 24, the former meshing with gear 25 fixed to the shaft 16. Suitable guides such as 26 are provided to prevent the excess hair-spring interfering with the motion of the balance assembly. The guides 26 may also serve to simulate the regulator pins in watch operation and thereby avoid a correction factor.

The rollers 3 and 4 grip the hair-spring positively and are geared together through the gears 23 and 24, revolving around the balance center on gear 25 so that the hair-spring is taken up without changing the "at rest" position of the balance. The drawing shows the balance at rest in such a position that the maximum vibration amplitude will be 180 degrees each side of zero displacement. This maximum may be adjusted greater or less, but it will remain fixed regardless of how much the hair-spring is reduced. The knurled knob 27 on shaft 16 provides the maximum amplitude adjustment, friction clutch 28 allowing the necessary slip between shaft 16 and the crank arm 15.

The driving motor 17 is a synchronous type which runs at an exact speed (revolutions per second), dependent upon the type hair-spring to be timed. If the hair-spring is to go into an 18,000 beat watch, the motor should run at exactly five revolutions per second from a controlled frequency, such as is produced by a tuning fork generator or quartz crystal oscillator.

To one end of the motor shaft 46 there is fixed a driving gear 6 which drives gear 7 loosely mounted on shaft 16. A vernier pinion 8 is rotatably mounted on the gear 7 and meshes with two gears 9, which is fixed to shaft 16, and 10, which is loose on shaft 16. Gear 9 is of the same pitch and pitch diameter as gear 10 but has one less tooth, so that each time pinion 8 makes one complete revolution around gears 9 and 10, the latter gear advances one tooth with respect to gear 9, giving a very slow vernier action.

Gear 10 carries bracket 11 to which the hair-spring take-up rollers 3 and 4 are attached as hereinbefore indicated, and as gear 10 slowly advances due to the vernier action, rollers 3 and 4 gradually reduce the hair-spring length by virtue of their relative motion with respect to the balance assembly which is connected therewith through gears 23, 24 and 25.

To the opposite end of the motor shaft 46 there is attached a crank 12 which carries the adjustable radius crank-pin 13. A connecting rod 14 joins the cranks 12 and 15, the latter crank being of a longer dimension than that of the radius of crank 12. The adjustment and dimensions of these members are such that as the motor shaft 46 rotates, the shaft 16 is given a slight oscillatory movement which very closely approaches simple harmonic motion of about 5 degrees amplitude, which is transmitted up through gear 9, pinion 8 and gear 10 to the outer end of the hair-spring 41, causing a forced vibration of the correct frequency in the hair-spring balance wheel assembly.

Gear 6 also drives gear 18 which carries cam 19. Cam 19 is so designed and adjusted that by means of push rod 20 pivotally mounted on the frame-piece 61, it inserts the contact finger 21 in the path of the roller pin 48 on the balance wheel at the time the balance is reaching the end of its swing. When the machine is first started and the amplitude of vibration of the balance assembly is very small, the roller pin 48 does not travel as far as the contact finger 21, but as the amplitude increases, due to the gradual shortening of the hair-spring, it finally reaches a predetermined value which causes contact between the pin 48 and the finger 21 whereupon a circuit for electromagnet 50 is completed to the grounded frame-piece 51 by way of the balance wheel 40, its shaft or staff 42, hair-spring 41, rollers 3 and 4, gear 10 and shaft 16. The electromagnet 50 functions to release the trigger switch 22 which opens the power circuit to the motor 17 causing the machine to be stopped. Because the balance wheel, as it approaches resonance, makes more than a complete turn, it is necessary to withdraw the contact finger 21 from the path of the roller pin 48, otherwise it would intercept the pin on the opposite side from the one desired, giving a false timing by stopping the machine too soon. The spring 53 serves in this capacity.

The contact finger 21 is insulated from ground by the insulator 55 in order to maintain the circuit to electromagnet 50 open until the circuit is completed by the engagement of the finger 21 with the grounded roller pin 48. In cases where the roller pin is a jewel, the finger 21 must consist of a pair of contacts which are closed by the impact of the roller jewel and the leading contact.

The machine is started by manually depressing the trigger switch 22 which locks in its closed position and causes the closure of contacts 60. The contacts 60 connect the motor to the supply circuit.

Briefly, the machine functions in the following manner: The hair-spring and balance wheel assembly is placed in position, by an operator, between the two pivot bearings 1 and 2. The trigger switch 22 is closed whereupon the motor 17 is energized causing the rotation of shaft 46 at an exact speed of, for example, five revolutions per second. The shaft 16, due to its mechanical coupling with the motor shaft oscillates at substantially a simple harmonic motion of about 5 degrees amplitude, which motion is transmitted to the hair-spring 42 by way of gear 9, pinion 8 and gear 10 with the result that the balance assembly is forced to vibrate at the correct frequency. Gear 6 fixed to the motor shaft rotates and causes the rotation of gear 7 which in turn causes the pinion gear 8 to revolve about the oscillating gears 9 and 10. Due to the difference in the number of teeth in gears 9 and 10 the latter experiences a movement relative to the former and also relative to gear 25 so that the gears 23 and 24 rotate about the gear 25 and in so doing cause the rollers 3 and 4 to rotate and take up on the hair-spring to reduce its effective length. As the effective length of the hair-spring is reduced the balance approaches resonance and when a condition of resonance is attained, that is, when the frequency of vibration of the balance assembly, or driven system, is the same as that of the shaft 16, which imparts the driving force to the balance assembly, the amplitude of oscillations of the driven system reaches a maximum, which is sufficient to cause the roller pin 48 to engage the contact finger 21 to cause the machine to be stopped as hereinbefore described. The balance assembly is now correctly timed and the effective length of hair-spring necessary to cause the assembly to have a resonant frequency equal to the predetermined frequency of the driving force is determined. The assembly may then be removed from the machine after the spring is marked in any suitable manner to indicate a reference point.

The machine of this invention is intended to be used with a battery of duplicate machines, as many as are required to keep an operator busy. The operator mounts a balance in a machine, starts it and passes on to another machine, returning to the first machine to remove the balance after timing. The timing operation may require from thirty seconds to two minutes, depending on how much excess hair-spring has been allowed over that actually required.

What is claimed is:

1. The method of imparting to a driven system a natural resonant frequency of oscillations of a predetermined value which comprises applying to the driven system an oscillatory driving force of the predetermined frequency, simultaneously effecting a gradual adjustment of one of the elements of the driven system to cause the resonant frequency of oscillations of the driven system to approach the predetermined frequency of the driving force and removing the driving force when the frequency of oscillations of the driven system matches the predetermined frequency of the driving force.

2. The method of regulating and adjusting the rate of oscillations of the balance wheel hair-spring assembly of a watch which comprises, imparting to the hair-spring of said assembly an oscillatory driving force having a predetermined frequency of oscillations, simultaneously effecting a gradual diminution in the effective length of the hair-spring to cause the resonant frequency of the assembly to approach the frequency of the driving force and removing the driving force when the resonant frequency of the assembly matches the frequency of the driving force.

3. In combination with a balance wheel hair-spring assembly of a clock, watch or the like, having a resonant frequency of vibration other than a predetermined frequency, means for subjecting said assembly to an oscillating force having a frequency equal to the predetermined frequency, means for effecting a gradual adjustment of the effective length of the hair-spring to cause the resonant frequency of said assembly to approach and match the frequency of the oscillating force and means operating automatically when the resonant frequency of said assembly matches the frequency of the oscillating force to halt the adjusting of the hair-spring.

4. A testing and adjusting device for the balance wheel hair-spring assemblies of clocks, watches and the like, comprising means for mounting a balance assembly to be tested, means including a constant speed motor for driving said device and applying an oscillatory force of predetermined frequency to said assembly to cause it to oscillate, means for gradually varying the effective length of the hair-spring during the oscillatory movement thereof to cause the frequency of oscillations thereof to approach the predetermined frequency and means operating automatically when the frequency of oscillations of said assembly matches the predetermined frequency to stop said device.

5. A testing and adjusting device for the balance wheel hair-spring assemblies of clocks, watches and the like, comprising means for mounting a balance assembly to be tested, means including a constant speed motor for driving said device and cause it to apply an oscillatory force of predetermined frequency to said assembly to cause it to oscillate, electromagnetic means controlling the circuit to said motor, means for gradually varying the effective length of the hair-spring during the oscillatory movement of said assembly to cause the frequency of oscillations thereof to approach the predetermined frequency and means operating automatically, when the frequency of oscillations of said assembly matches the predetermined frequency, to cause the operation of said electromagnetic means.

6. In an apparatus for adjusting watches, clocks and the like, means for mounting a vibrating balance assembly including a balance wheel and hair-spring and having a resonant frequency of vibration other than a predetermined frequency, means operating to effect a gradual adjusting of one of the elements of said assembly until the assembly assumes a resonant frequency of vibration corresponding to the predetermined frequency and means operating automatically and as a consequence of said assembly vibrating at the predetermined frequency for arresting the operation of said adjusting means.

7. In an apparatus for adjusting hair-springs of watches, clocks, and the like, means for mounting a vibrating balance assembly including a balance wheel and hair-spring and having a resonant frequency of vibration other than a predetermined frequency, means operating to effect a gradual diminution in the effective length of the hair-spring until the assembly assumes a resonant frequency of vibration corresponding to the predetermined frequency and means operating automatically and as a consequence of said assembly vibrating at the predetermined frequency for arresting any further diminution in the effective length of the hair-spring.

8. In an apparatus for adjusting hair-springs of watches, clocks and the like, means for mounting a balance assembly including a balance wheel and hair-spring and having a resonant frequency of vibration other than a predetermined frequency, means for vibrating said assembly at the predetermined frequency, means including a hair-spring take-up mechanism which functions during the vibration of said assembly to gradually reduce the effective length of the hair-spring, whereby the amplitude of vibration of the assembly increases and means operating automatically when the amplitude of vibration of said assembly reaches a predetermined value for preventing any further functioning of said hair-spring take-up mechanism.

9. In an apparatus for adjusting hair-springs of watches, clocks and the like, means for mounting a balance assembly including a balance wheel and hair-spring and having a resonant frequency of vibration other than a predetermined frequency, means for driving said assembly at the predetermined frequency, means for automatically and gradually reducing the effective length of the hair-spring during the operation of said driving means until the effective length of the hair-spring is such as to impart to said assembly a resonant frequency of vibration corresponding to the predetermined frequency whereupon the amplitude of vibration of said assembly reaches a maximum, a motor controlling the operation of both said means, and means operating automatically and as a consequence of the assembly attaining its maximum amplitude for arresting further operation of said motor.

10. An apparatus for adjusting hair-springs of watches, clocks and the like, comprising means for mounting a balance assembly including a balance wheel and hair-spring, means including a constant speed motor for driving the apparatus and causing it to apply an oscillatory force of predetermined frequency to said assembly to effect its oscillation, electromagnetic means controlling the circuit for said motor, means for gradually varying the effective length of the hair-spring during the oscillatory movement of said assembly to cause the frequency of oscillations thereof to approach the predetermined frequency, a contact for controlling the circuit for said electromagnetic means and means mounted on the balance wheel of said assembly and adapted to automatically engage said contact when the frequency of oscillations of said assembly matches the predetermined frequency whereupon said electromagnetic means functions to open the circuit to said motor.

HENRY B. BROWN.